(12) United States Patent
Sheridan et al.

(10) Patent No.: US 10,488,261 B2
(45) Date of Patent: *Nov. 26, 2019

(54) COMPACT PORTABLE COLOR SENSOR

(71) Applicant: Nix Sensor Ltd., Hamilton (CA)

(72) Inventors: Matthew Sheridan, Burlington (CA); Michael Bot, Oakville (CA); Thomas Langille, Hamilton (CA); James Strack, Hamilton (CA); Dixon Paez, Ancaster (CA)

(73) Assignee: Nix Sensor Ltd., Hamilton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,813

(22) Filed: Dec. 22, 2017

(65) Prior Publication Data

US 2018/0143076 A1   May 24, 2018

Related U.S. Application Data

(63) Continuation-in-part of application No. 14/974,040, filed on Dec. 18, 2015, now Pat. No. 9,891,109.

(Continued)

(51) Int. Cl.
  *G01J 3/50*  (2006.01)
  *G01J 3/10*  (2006.01)
  *G01J 3/02*  (2006.01)

(52) U.S. Cl.
  CPC ............. *G01J 3/50* (2013.01); *G01J 3/0256* (2013.01); *G01J 3/0264* (2013.01);
  (Continued)

(58) Field of Classification Search
  CPC .......... G01J 3/50; G01J 3/0291; G01J 3/0264; G01J 3/0283; G01J 3/501; G01J 3/0256; G01J 3/10
  See application file for complete search history.

(56) References Cited

U.S. PATENT DOCUMENTS 3,910,701 A * 10/1975 Henderson ........... G01N 21/255
                                                      250/226
4,567,551 A *  1/1986 Choate ................... G02B 21/10
                                                      362/140

(Continued)

FOREIGN PATENT DOCUMENTS

EP       1103798 A2 *  5/2001 ............... G01J 3/28
EP       1482298 A1 * 12/2004 ............... G01J 3/02

*Primary Examiner* — Mohamed K Amara
(74) *Attorney, Agent, or Firm* — Ridout & Maybee LLP

(57) ABSTRACT

The present concept is a compact portable colour sensor for measuring colour of a substrate. The sensor includes a lower and upper housing, and a detector portion. The detector portion includes a printed circuit board connected to an interior of the housing. The circuit board includes at least one LED and one colour sensor mounted on a bottom side thereof. At least one transparent light transmitting light pipe and a transparent material are mounted interferingly between the bottom side of the printed circuit board and the interior of the lower housing. The compact portable colour sensor is configured such that light transmitted by the LED impinges upon the substrate through a light cavity, and is at least partially reflected back to the colour sensor to take a measurement. Preferably the lower housing has an inverted truncated conical shape.

13 Claims, 10 Drawing Sheets

Related U.S. Application Data

(60) Provisional application No. 62/517,328, filed on Jun. 9, 2017.

(52) U.S. Cl.
CPC ........... *G01J 3/0283* (2013.01); *G01J 3/0291* (2013.01); *G01J 3/10* (2013.01); *G01J 3/501* (2013.01)

(56) References Cited

U.S. PATENT DOCUMENTS

| | | | | |
|---|---|---|---|---|
| 5,272,518 A * | 12/1993 | Vincent | ............ | G01J 3/12 250/226 |
| 5,377,000 A * | 12/1994 | Berends | ............ | G01J 3/51 356/407 |
| 5,789,741 A * | 8/1998 | Kinter | ............ | G01J 3/10 209/582 |
| 5,813,403 A * | 9/1998 | Soller | ............ | A61B 5/0075 600/310 |
| 5,963,333 A * | 10/1999 | Walowit | ............ | G01J 3/0251 356/328 |
| 6,075,595 A * | 6/2000 | Malinen | ............ | G01J 3/10 356/328 |
| 6,111,244 A * | 8/2000 | Wang | ............ | H04N 1/02835 250/208.1 |
| 6,236,669 B1 * | 5/2001 | Nakanishi | ............ | G02B 6/4246 372/43.01 |
| 6,243,350 B1 * | 6/2001 | Knight | ............ | B82Y 10/00 369/112.24 |
| 6,304,767 B1 * | 10/2001 | Soller | ............ | A61B 5/14535 356/39 |
| 6,603,551 B2 * | 8/2003 | Mestha | ............ | G01J 3/02 250/226 |
| 6,621,576 B2 * | 9/2003 | Tandon | ............ | G01J 3/02 356/320 |
| 7,443,506 B2 * | 10/2008 | He | ............ | G01J 3/02 250/226 |
| 7,474,402 B2 * | 1/2009 | Shannon | ............ | G01J 3/02 356/405 |
| 7,502,112 B2 * | 3/2009 | Kahn | ............ | G01J 3/02 356/405 |
| 7,538,871 B2 * | 5/2009 | Frick | ............ | G01J 3/02 356/326 |
| 7,557,925 B2 * | 7/2009 | Nisper | ............ | G01J 3/02 356/406 |
| 8,705,018 B2 | 4/2014 | Benderly et al. | | |
| 8,859,969 B2 * | 10/2014 | Micheels | ............ | G01N 21/255 250/339.07 |
| 9,322,644 B2 * | 4/2016 | Weinhold | ............ | G01B 11/303 |
| 9,897,534 B2 * | 2/2018 | Sheridan | ............ | G01N 21/01 |
| 10,302,496 B2 * | 5/2019 | Corrochano | ............ | G01J 3/513 |
| 2002/0135752 A1 * | 9/2002 | Sokolov | ............ | A61B 5/0075 356/39 |
| 2005/0041926 A1 | 2/2005 | Elkins, II | | |
| 2007/0146888 A1 * | 6/2007 | Schmidt | ............ | G01J 3/02 359/589 |
| 2009/0116017 A1 * | 5/2009 | Xu | ............ | G01N 21/474 356/436 |
| 2009/0296085 A1 * | 12/2009 | Mestha | ............ | G01J 3/02 356/319 |
| 2010/0187440 A1 * | 7/2010 | Jaffe | ............ | G01J 1/58 250/459.1 |
| 2016/0238450 A1 * | 8/2016 | Sheridan | ............ | G01J 3/50 |
| 2017/0202605 A1 * | 7/2017 | Shelton, IV | ............ | A61B 18/1447 |
| 2018/0094974 A1 * | 4/2018 | Won | ............ | A61B 5/0075 |

* cited by examiner

COMPACT PORTABLE COLOR SENSOR

The present application claims priority from U.S. provisional application 62/517,328 filed Jun. 9, 2017, under the title: Compact Portable Colour Sensor by Matthew Sheridan, Michael Bot, Thomas Langille, James Strack and Dixon Paez and this application is also a continuation in part of U.S. application Ser. No. 14/974,040 filed Dec. 18, 2015 under the title; Portable Colour Sensor by Matthew Sheridan

FIELD OF THE INVENTION

The present concept relates to a device for measuring and analysing colours and more particularly it relates to small handheld inexpensive colour measuring device which can interface via Bluetooth with smartphones and convert the colour readings into any number of current colour models, or spaces.

BACKGROUND OF THE INVENTION

There is a need to quickly and accurately be able to measure colours on a variety of different surfaces and convert the colour measurement into a number of standard colour spaces.

There are a number of prior art devices which have attempted to measure colour each with shortcomings normally related to accuracy reproducibility, portability, cost of manufacture and inability to convert readings into a number of standard colour spaces used by different industries.

SUMMARY OF THE INVENTION

The present concept a compact portable colour sensor for measuring colour of a substrate the sensor includes:
  a) a lower housing including an interior, the lower housing for cooperatively mating together with an upper housing;
  b) a detector portion including a printed circuit board rigidly connected to the interior of the lower housing and substantially enveloped by the upper and lower housings when in a mated position;
  c) wherein the printed circuit board includes at least one LED and one colour sensor mounted on a bottom side of the printed circuit board;
  d) at least one transparent light transmitting light pipe and a transparent material mounted which is mounted interferingly between the bottom side of the printed circuit board and the interior of the lower housing;
  e) wherein the compact portable colour sensor is configured such that light transmitted by the LED impinges upon the substrate and is at least partially reflected back to the colour sensor to take a measurement.

Preferably wherein the lower housing has an inverted truncated conical shape and the upper housing has an upright truncated conical shape. The conical shape may be a modified hexagonal or octagonal shape as shown in the drawings or any other conical tapering geometry. The cone taper of the conical shape may be very slight barely visible to the eye or the taper may very pronounced as shown in the drawings.

Preferably wherein the entire compact portable colour sensor for final assembly is constructed of no more than five individual parts including one light pipe.

Preferably wherein the entire compact portable colour sensor for final assembly is constructed of no more than six individual parts including two light pipes.

Preferably wherein the light pipe is manufactured of plastic material.

Preferably wherein the material is plastic.

Preferably wherein the light pipe includes an LED cavity for receiving an LED therein.

Preferably wherein the light pipe is y shaped wherein the LED cavity forming the top opening of the y.

Preferably wherein the printed circuit board includes at least one LED and one colour sensor mounted on the bottom side of the printed circuit board.

Preferably wherein the light pipe includes a LED cavity.

Preferably wherein in the mated position the LED is received within the LED cavity of the light pipe.

Preferably wherein the light pipe is y shaped wherein the LED cavity forms the top opening of the y.

Preferably wherein the lower housing includes at least one light pipe cavity and at least one lens cavity for slide-ably receiving the light pipe and the lens therein respectively.

Preferably wherein the material is U shaped and the bottom of the U transmits light to the colour sensor.

Preferably wherein the light pipe includes a flange and the light pipe cavity includes at least one light pipe rib which includes a light pipe slot for receiving the light pipe flange slideably therein.

Preferably wherein the detector portion includes a battery mounted on a top side of the printed circuit board.

BRIEF DESCRIPTION OF THE DRAWINGS

The present will now be describe by way of example only with reference to the following drawings in which.

DETAILED DESCRIPTION OF THE PREFERRED EMBODIMENTS

Figure 1:
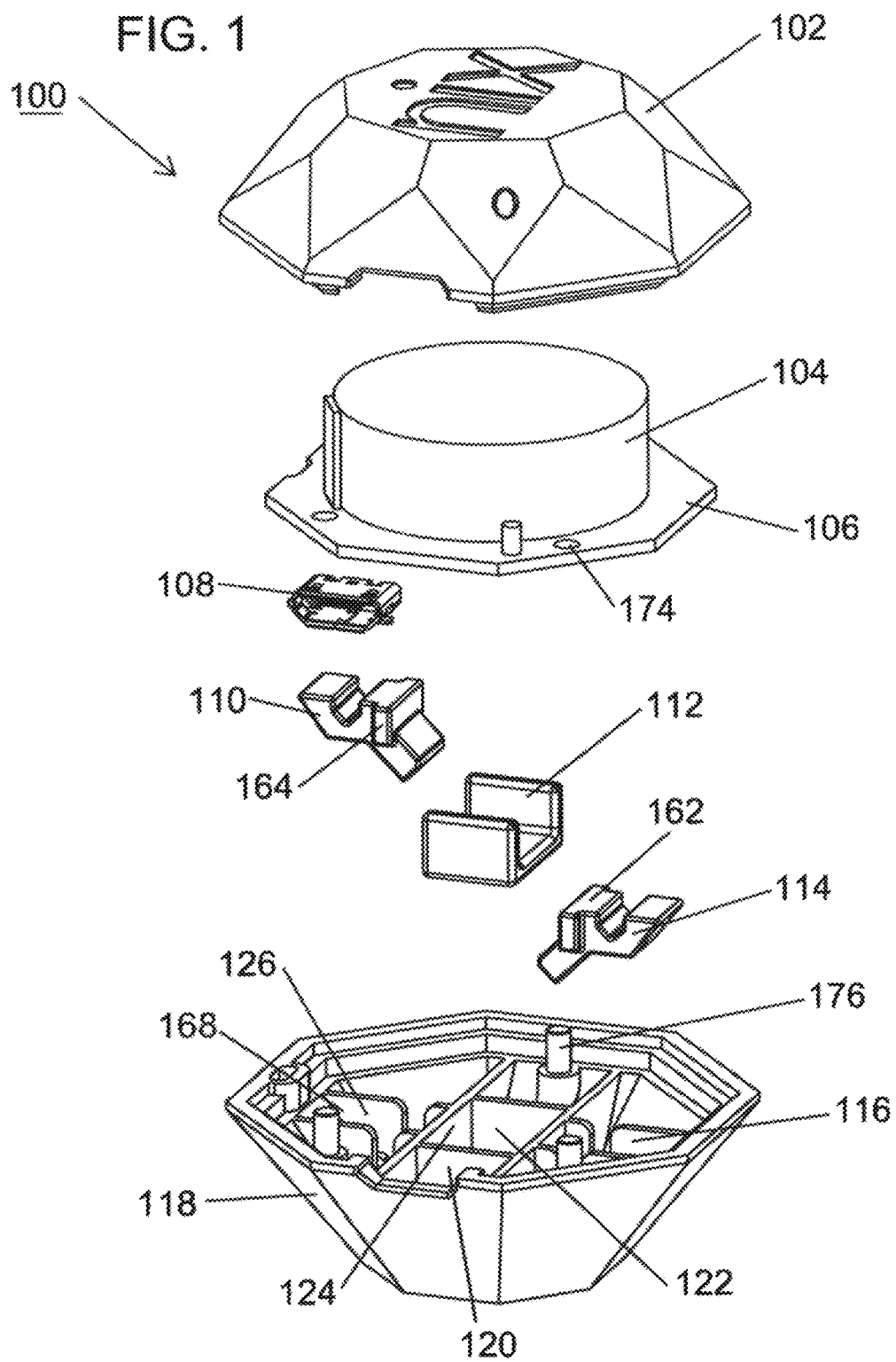
FIG. 1 is an exploded assembly perspective of compact portable colour sensor.
Figure 2:
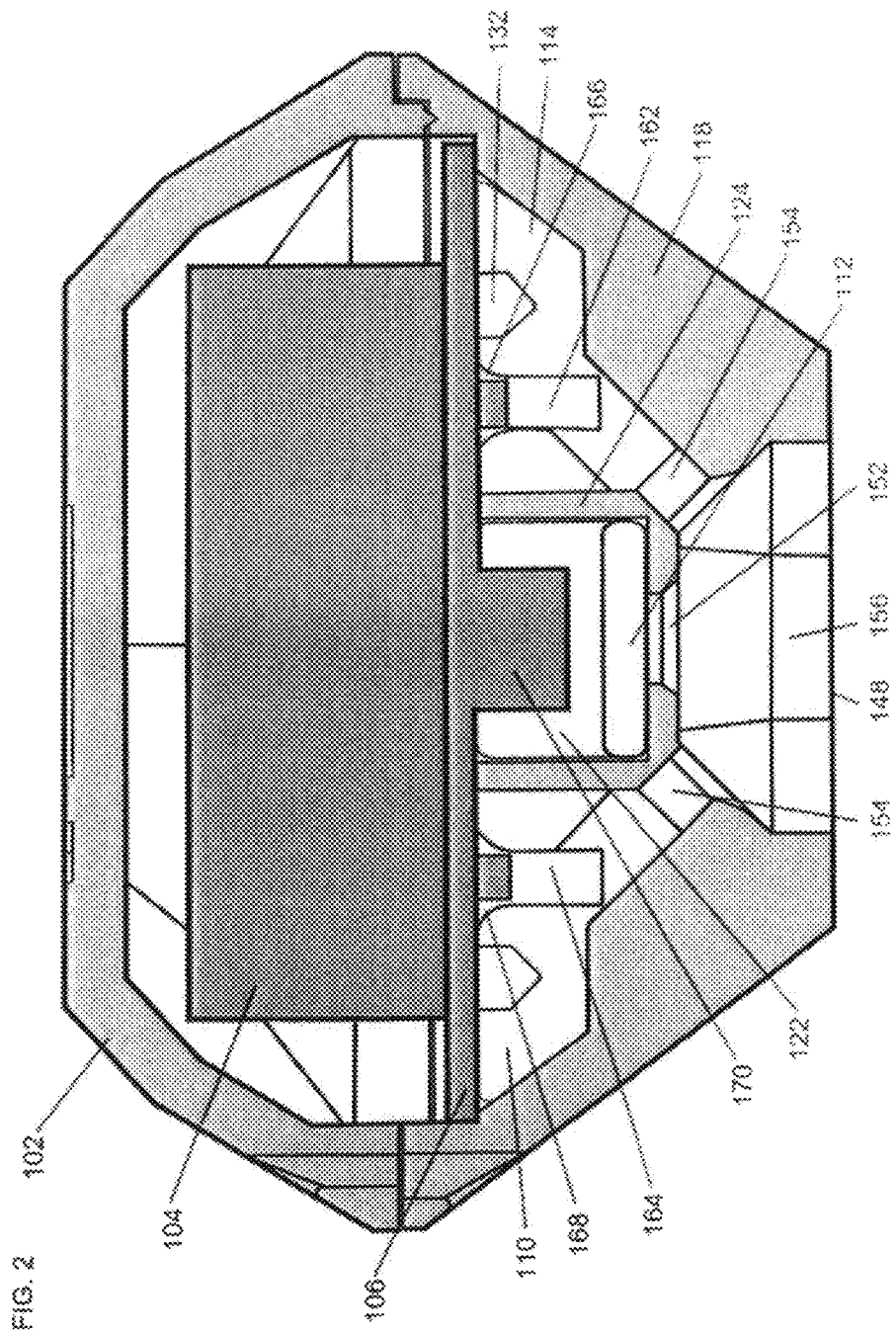
FIG. 2 is a side elevation cross-section view of compact portable colour sensor.
Figure 3:
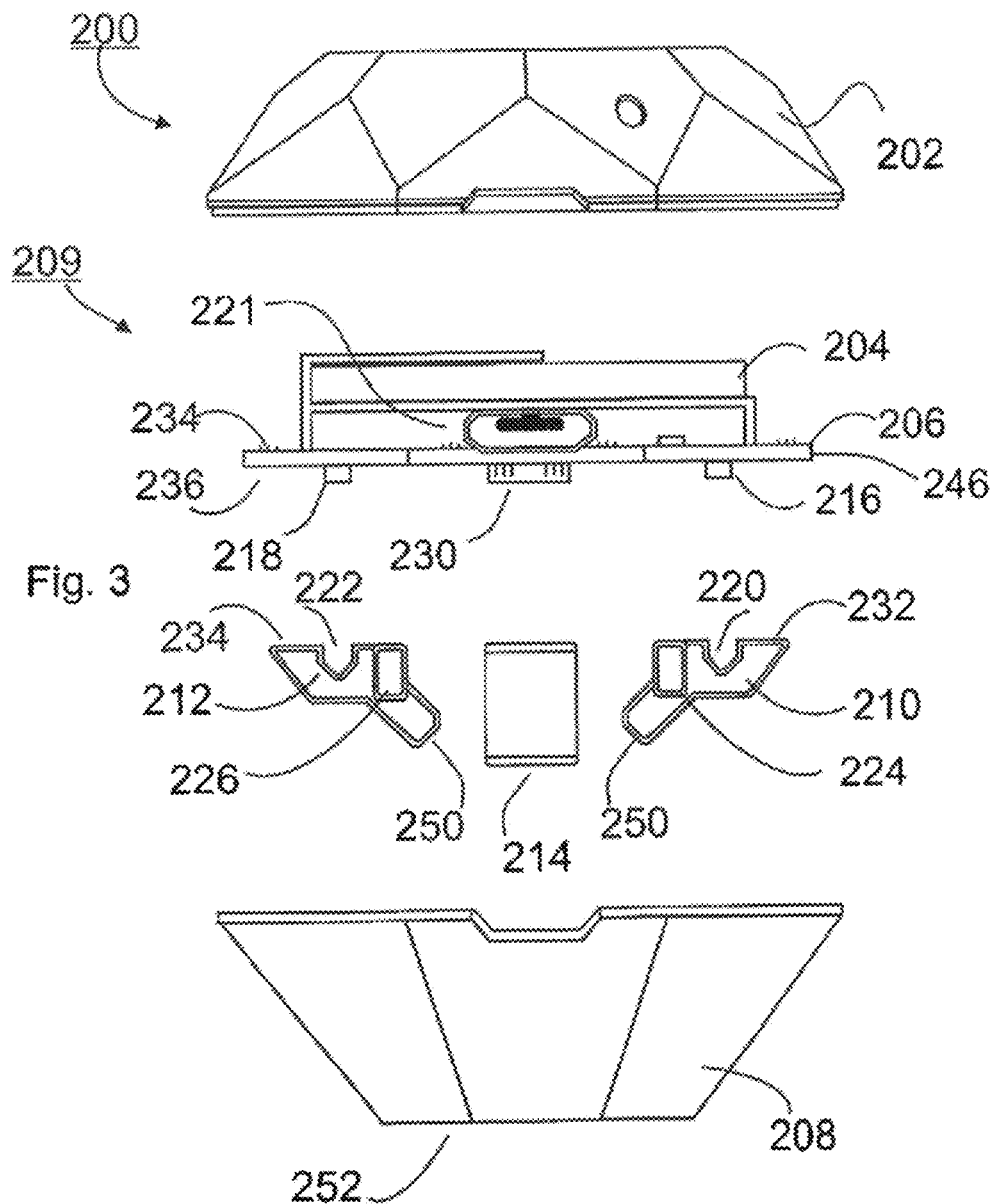
FIG. 3 is an exploded assembly elevational view of an alternate embodiment of the COMPACT PORTABLE COLOUR SENSOR
Figure 4:
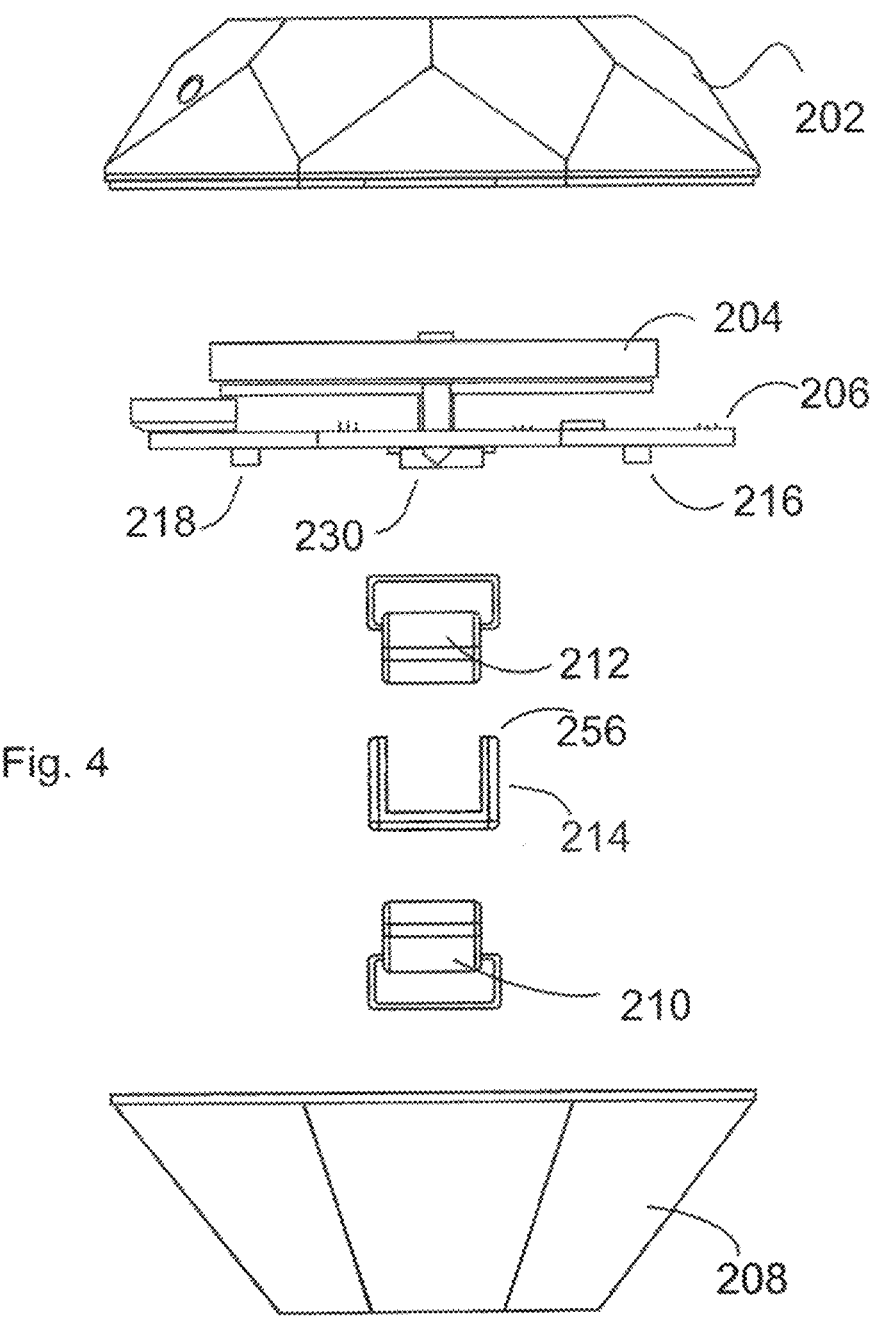
FIG. 4 is an exploded assembly elevational view of an alternate embodiment of the COMPACT PORTABLE COLOUR SENSOR as shown in FIG. 3
Figure 5:
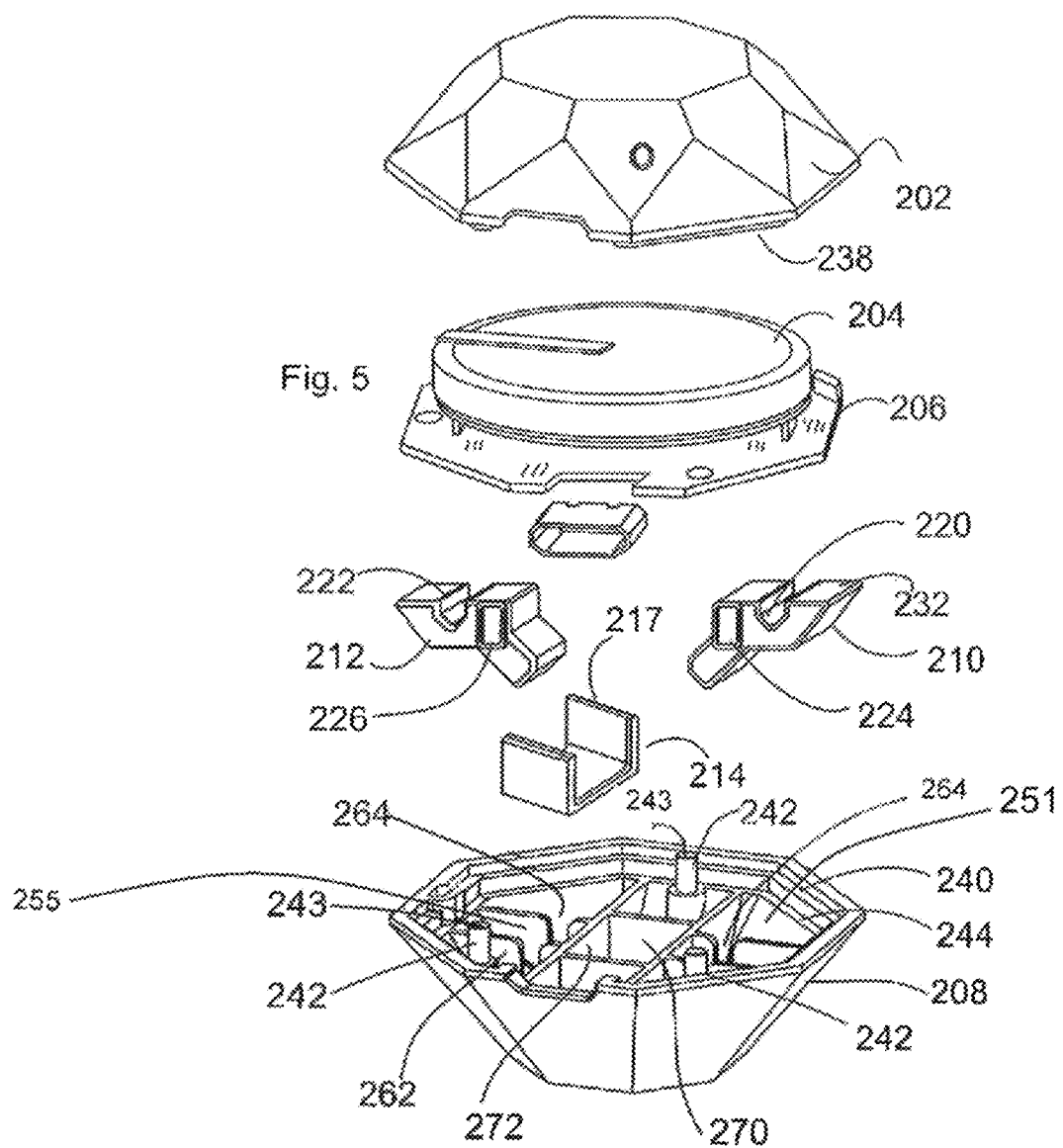
FIG. 5 is a schematic exploded assembly perspective view of the COMPACT PORTABLE COLOUR SENSOR shown in FIG. 3

Referring to FIG. 1 which shows an exploded assembly perspective view of the compact portable colour sensor 100 and FIG. 2 which shows a side elevation cross-section view of the compact portable colour sensor. Compact portable colour sensor 100 includes a single printed circuit board (PCB) 106, battery 104, micro USB connector 108, first light pipe 114 and second light pipe 110, material 112, upper housing 102 and lower housing 118.

First light pipe 114 and second light pipe 110 are mounted into lower housing 118 in first light pipe receiver 116 and second light pipe receiver 126, respectively. Material 112 is mounted into receiver box 122 All of the internal components are sequentially fitted and locked into place wherein the PCB 106 is urged downwardly into lower housing 118 thereby pushing downwardly upon the first and second light pipes 114 and 110 and material 112, in effect positively holding the components in lower housing 118 wherein the light pipes 114 and 110, and material 112 are held in place. Receiver box 122 houses receiving port 150 which receives material 112.

Lower housing 118 also includes a lens dust cover 152, a receiving port 150, light emitting ports 154 and a light cavity 156. Light enters through light emitting ports 154 from first light pipe 114 and second light pipe 110.

The reader will see that the first flange 162 of first light pipe 114 slideably engages with first slot 166. Second flange 164 of second light pipe 110 slideably engages with second slot 168.

In this manner first light pipe 114 and second light pipe 110 are slideably urged into position into the lower housing 118. Dust cover 152 is placed into the bottom of receiver box 122 and optical tube 170 is slideably received within receiver box 122.

Thereafter PCB 108 including micro USB connector 108 is fitted with locking members 176 fitting into apertures 174 of PCB 106 on top of the light pipes and optical tube 170. Upper housing 102 is then fitted with lower housing 118, sealing the device and allowing no unintended light to enter the device. Light isolation walls 120 and 124 prevent light from LEDs 132 from straying out of the light emitting ports 154.

The LEDS used have a broad parallel spectrum of visible light such that all wavelengths of visible light are emitted by the LEDS 132. In order to ensure consistency and reproducibility components having extremely low drift and low temperature coefficient variances are utilized throughout the device.

Readings obtained from the colour sensor are fed through on board integrated circuitry processing units which provide a predictable, stable and reproducible output.

Figure 12:
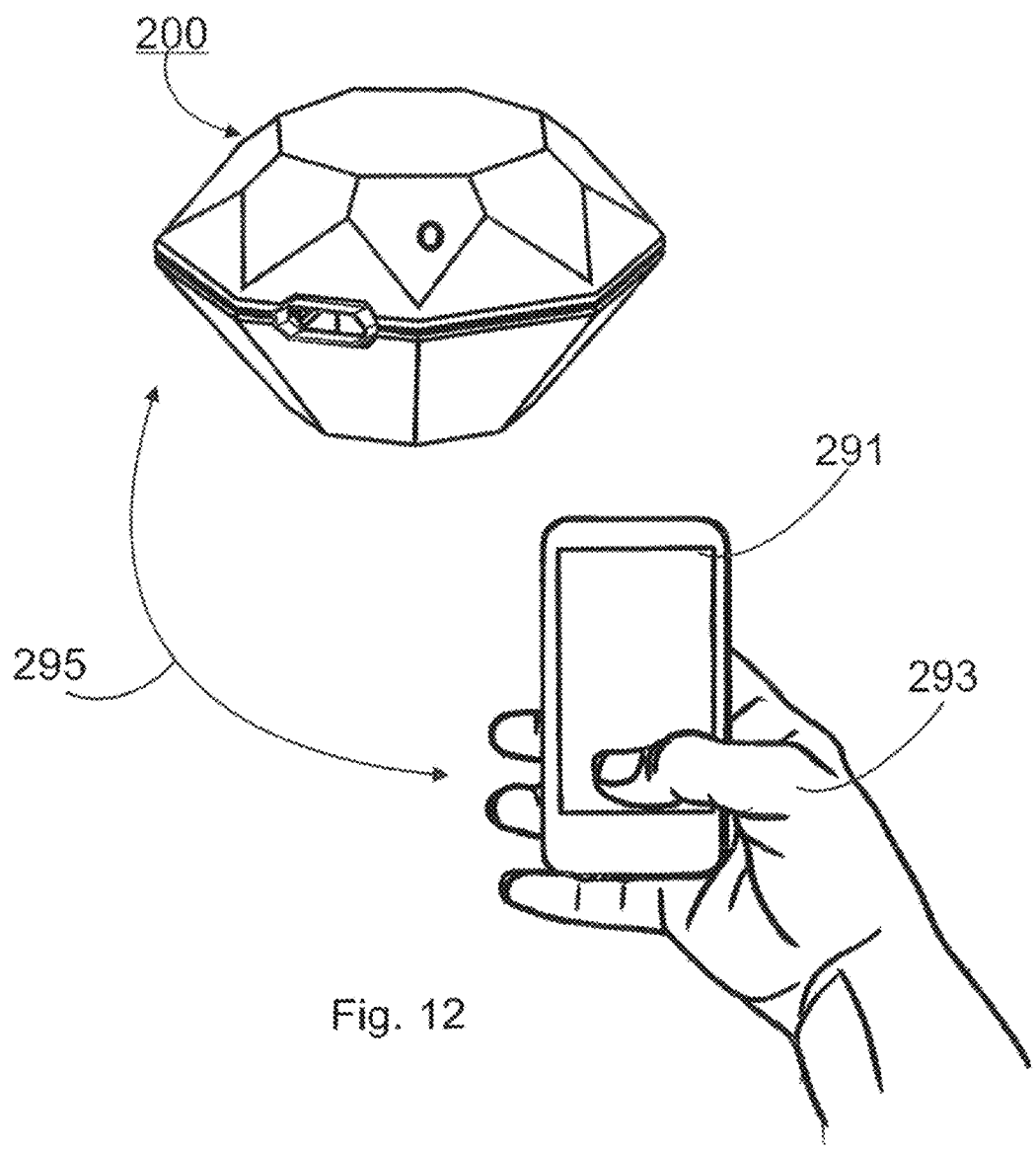
FIG. 12 is a schematic perspective view of a COMPACT PORTABLE COLOUR SENSOR deployed and communicating with a hand-held device

The unit includes an integral Bluetooth transmission device for wirelessly transmitting data 295 to a smart-phone 291 or hand held device 291 which together with a smart-phone application for presenting the data in usable format. FIG. 12 shows a hand 293 holding a cell-phone 291 and wirelessly communicating with the compact portable colour sensor 200.

It is also possible to communicate through a hardwired mini USB port 108 to a laptop or other computer. The device is calibrated through the hardwired mini USB port 108 prior to the shipping.

The outputs are converted into usable colour spaces including the well known RGB colour space, HSL colour space, HSV colour space, LAB colour space, XYZ colour space and is also converted into HTML, CMYK or Pantone® units. The processor software application is able to convert to any print system using a delta e calculation to determine what available paint is closest (mathematically) to the scanned sample.

The contact surface 148 is placed against a substrate or surface to be analysed for colour such as a painted wall, skin, and a host of other surfaces and materials.

Light emitted from LED's 132 is conducted down first light pipe 114 and second light pipe 110, exiting into light cavity 156 onto a substrate to be measured. Some of the light is reflected back up optical tube receiving port 150 where it is received by colour sensor 182 on PCB 106 and a measurement is taken and recorded.

Compact portable colour sensor 100 has few parts and requires no glue or caulking to put together as the pieces are drop-in, sequentially locking the parts into place as they are added.

Alternate Embodiment

Referring now to FIGS. 3 through 12 which depict an alternate embodiment of the present concept, namely compact portable colour sensor generally shown as 200 which includes the following major components, namely, upper housing 202, lower housing 208, a first light pipe 210, second light pipe 212, material 214, detector portion 209.

Detector portion 209 includes a printed circuit board 206 having a top side 234 and a bottom side 236. Battery 204 and USB connector 221 are connected and housed on the top side 234 of PC Board 206. First LED 216, second LED 218, as well as colour sensor 230 are mounted on the bottom side 236 of printed circuit board 206 which also includes a periphery 246. First pipe light 210 includes a first LED cavity 220 a light pipe top surface 232 a first flange 224 and a transmission face 250. Second light pipe 212 includes a second LED cavity 222 a second light pipe top surface 234 a second flange 226 and a transmission face 250.

First light pipe 210 and second light pipe 212 as well as material 214 are translucent and preferably are made from plastic having known optical qualities. Referring now to FIGS. 4&5 which again are schematic assembly views of the compact portable colour sensor shown generally as 200 in FIG. 3, the reader will see in FIG. 5 for example, that the lower housing 208 includes three locating posts 242 which cooperatively engage into locating holes 254 shown in FIG. 8 when printed circuit board 206 is placed into lower housing 208.

Figure 9:
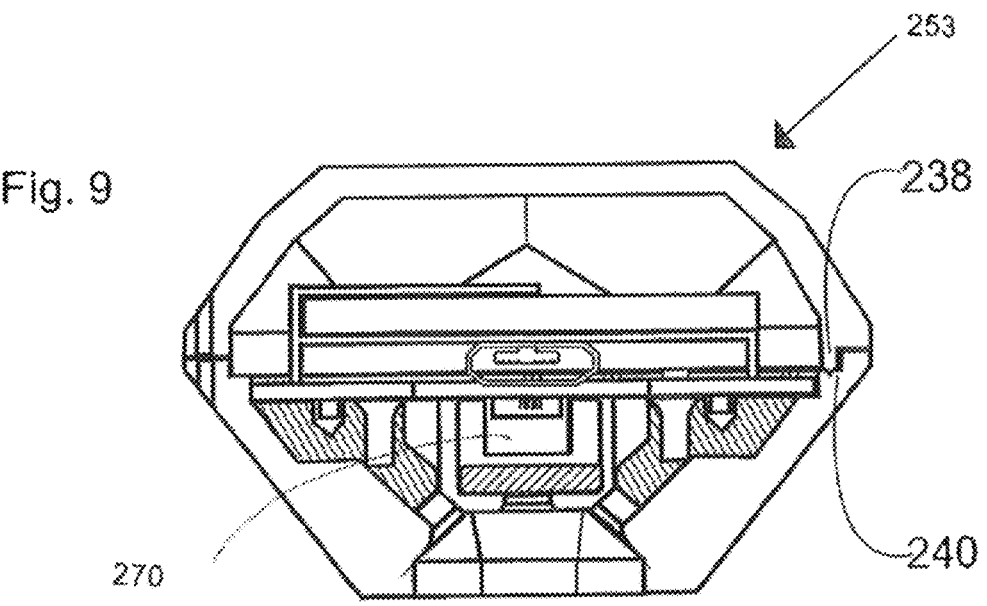
FIG. 9 is a partial cross sectional view of the COMPACT PORTABLE COLOUR SENSOR shown in FIG. 3
Figure 10:
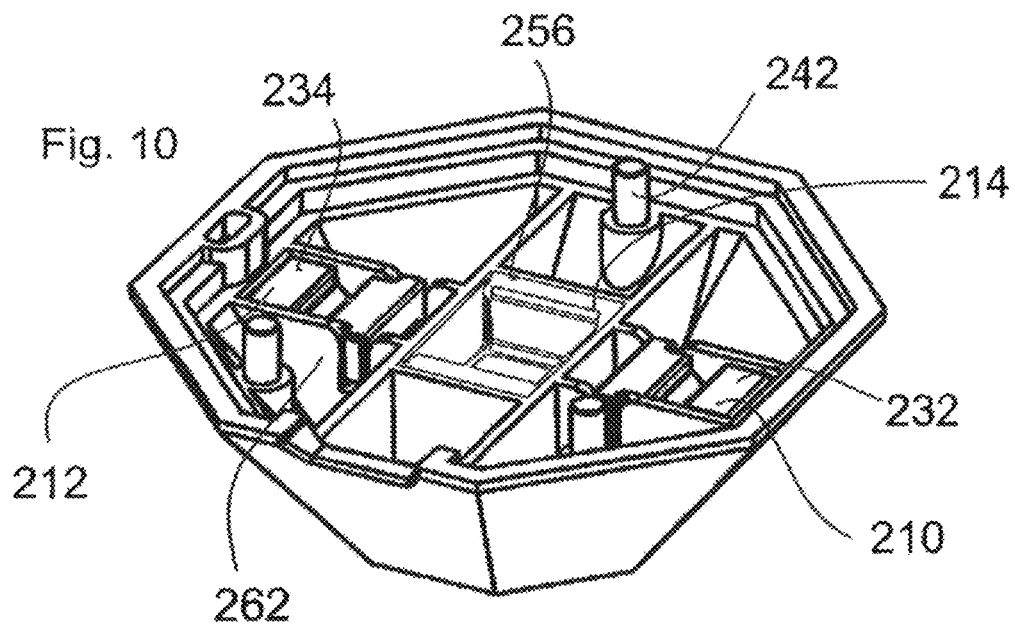
FIG. 10 is a top schematic perspective view looking into the lower housing with the upper housing removed
Figure 11:
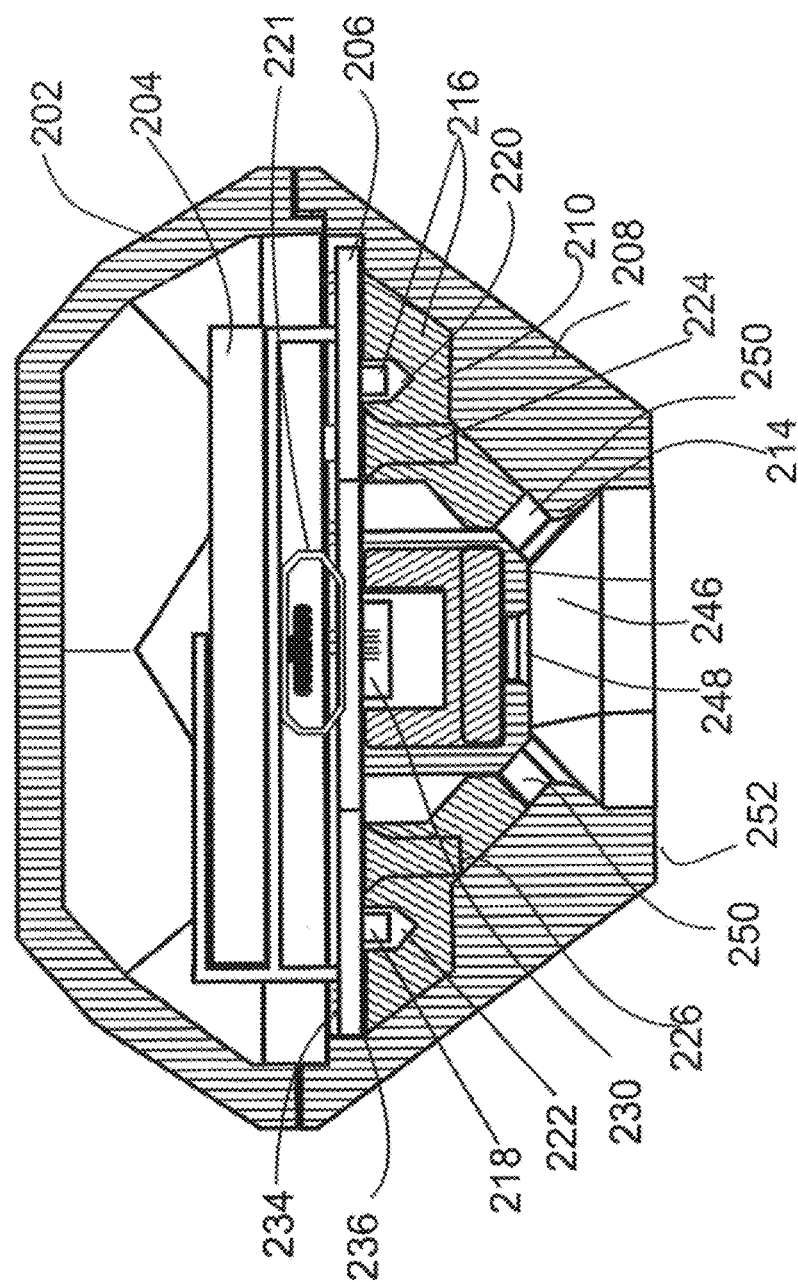
FIG. 11 is a schematic cross sectional view of the COMPACT PORTABLE COLOUR SENSOR shown in FIG. 3

Upper housing 202 includes a top ridge 238 which cooperatively abuts against sealing surface 240 which is better viewed in FIG. 9 in cross section.

Lower housing 208 includes a reflected light passageway 270 which receives lens 214 therein. Lower housing 208 also includes light pipe ribs 262 having light pipe slots 264 which cooperatively receive flanges 224 and 226 therein as first light pipe 210 and second light pipe 212 are slid into lower housing 208 together with material 214.

Reflected light passageway 270 includes passageway side walls 272 and lower housing 208 further includes light pipe ribs 262 and light pipe slots 264.

With printed circuit board 206 in position, namely with locating posts 242 positioned through locating holes 254 a heat welding process is undertaking which heat welds surface 243 of each of the locating posts 242 thereby forcibly clamping down printed circuit board 206 onto printed circuit board seat surface 244 of lower housing 208.

During this seating operation which is essentially a heat welding operation wherein a portion of the top weld surface 243 of the locating post 242 is melted over and onto printed circuit board 206 in riveting fashion by melting weld surface 243, one rigidly holds printed circuit board 206 against printed circuit board seat surface 244 but additionally the bottom side 236 of printed circuit board 206 abuts against lens top surface 217 light pipe top surface 232 and second light pipe surface 234 thereby preventing these components from rattling and or loosening within lower housing 208 and keeping them rigidly and firmly in the position that they are supposed to be in. In other words, light pipes 210 and 212 and material 214 are interferingly sandwiched between bottom side 236 of printed circuit board 246 and the interior 251 portions of lower housing 208.

The reader will also note that first light pipe 210 and second light pipe 212 include a first LED cavity 220 and a second LED cavity 222 which receives first LED 216 and second LED 218 therein respectively. It was found unexpectedly that these LED cavities 220 and 222 ensure that light emanating from first LED 216 and second LED 218 are more uniformly and repeatedly transmitted down to transmission face 250 of each of the light pipes 210 and 212. Additionally, due to the fact that light pipe top surface 232 in regard to first light pipe 210 and second light pipe top surface 234 in regard to second light pipe 212 are abutting against the bottom side 236 of printed circuit board 206 means that the distance between and or the space between first LED 216 and the first LED cavity 220 and the second LED 218 and the second LED cavity 222 are kept extremely uniform and therefore the light being transmitted through the light pipes remains consistent and highly repeatable.

In order to complete the assembly of the compact portable colour sensor upper housing 200 and more specifically the top ridge 238 of upper housing 202 abuts against the sealing surface 240 of lower housing 208. The upper housing 202 and the lower housing 208 are ultrasonically welded together such that a continuous seal is created between the upper housing 202 and the lower housing 208 such that the upper and lower housings 202 and 208 cannot be taken apart. This also aids in the calibration and the repeatability of the units ability to take measurements.

The interference fits between the printed circuit board 206 and the light translucent components, namely first light pipe 210 second light pipe 212 and material 214 means that a gasket between the printed circuit board and the lower housing is no longer required in order to ensure that the components are held in place and rattle free and the assembly time and the number components required for the unit is greatly reduced due to the interference fit between the light pipes and lens and the bottom side 236 of printed circuit board 206.

Figure 6:
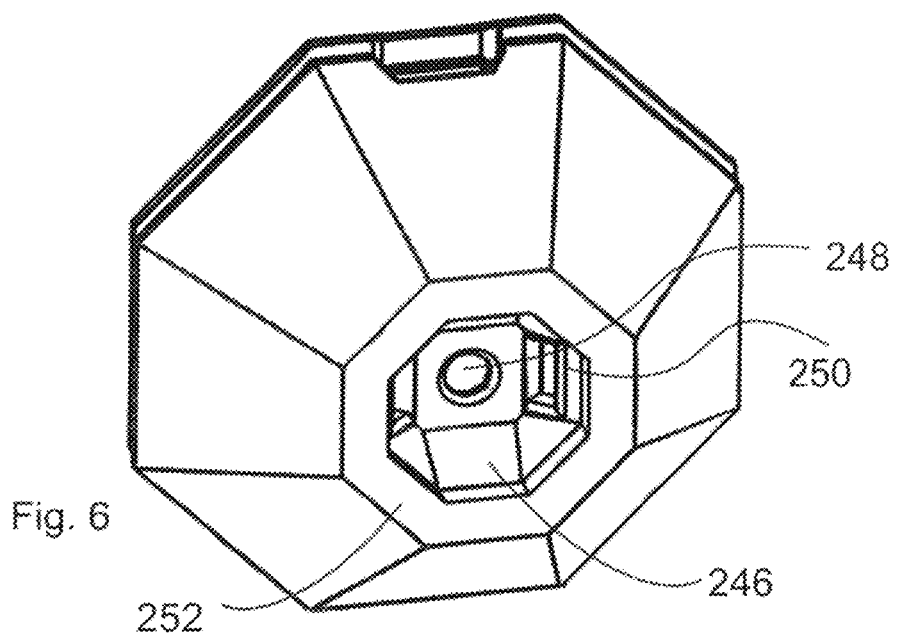
FIG. 6 is a schematic bottom perspective view of the lower housing showing the light cavity
Figure 7:
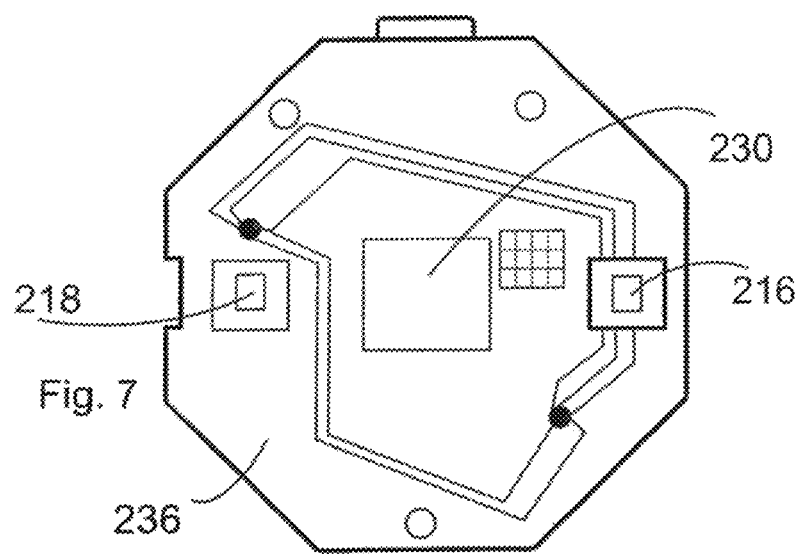
FIG. 7 is a plain view of the bottom side of the printed circuit board
Figure 8:
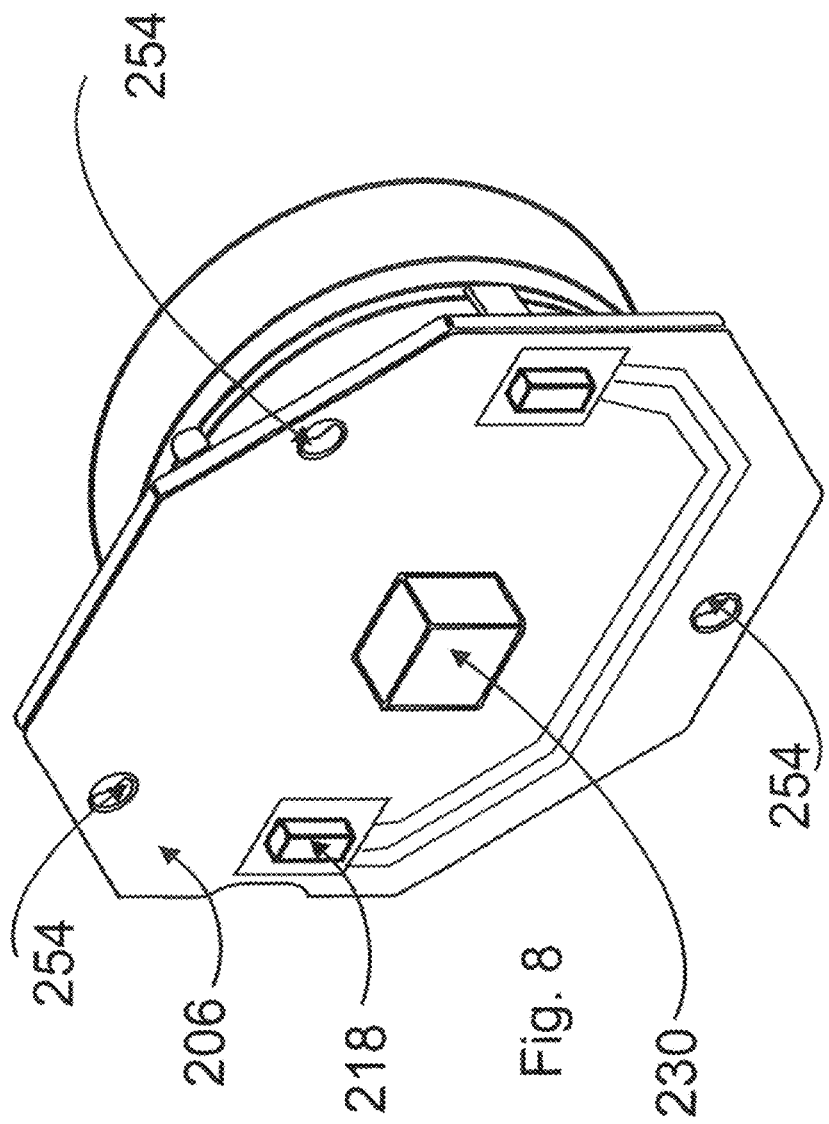
FIG. 8 is a schematic perspective view of the printed circuit board together with the battery mounted thereon

Referring now to FIG. 6, the reader will note that contact surface 252 is a surface upon which the compact portable colour sensor 200 is placed in order to take a colour reading. Light is transmitted from first LED 216 and second LED 218 down through light pipes 210 and 212 respectively and into light cavity 246 where it is reflected off the surface of whatever sample is being measured (preferably a flat surface) by making contact with the sample with contact surface 252. It is possible to take measurements of samples that are not flat by using certain shields which prevent transient or ambient light from entering into light cavity 246 which would throw off the colour measurement taken by colour sensor 230.

Light is reflected off the sample not shown in the drawings and back up through lens dust cover 248 and on through material 214 and ultimately impinge upon colour sensor 230 which is taking a reading.

The compact portable colour sensor 200 is put through a series of calibration tests using are predetermined colours which are known to fine tune and adjust the calibration of the unit once. Ongoing calibration is not required.

The electronics within printed circuit board 206 are such that a temperature measurement can be taken to adjust for drift in temperature however all of the other componentry is extremely stable resulting in highly reproducible results over the life of the unit.

It should be apparent to persons skilled in the arts that various modifications and adaptation of this structure described above are possible without departure from the spirit of the invention the scope of which defined in the appended claims.

We claim:

1. A compact portable colour sensor for measuring colour of a substrate, the sensor comprising:
    a) a lower housing including an interior, the lower housing for cooperatively mating together with an upper housing;
    b) a detector portion including a printed circuit board rigidly connected to the interior of the lower housing and substantially enveloped by the upper and lower housings when in a mated position;
    c) wherein the printed circuit board includes at least one LED and one colour sensor mounted on a bottom side of the printed circuit board;
    d) at least one transparent plastic light transmitting light pipe and a transparent cover mounted which are mounted interferingly between the bottom side of the printed circuit board and the interior of the lower housing;
    e) wherein the compact portable colour sensor is configured such that light transmitted by the LED impinges upon the substrate and is at least partially reflected back to the colour sensor to take a measurement.

2. The compact portable colour sensor claimed in claim 1 wherein the lower housing has an inverted truncated conical shape and the upper housing has an upright truncated conical shape.

3. The compact portable colour sensor claimed in claim 2 wherein the entire compact portable colour sensor for final assembly is constructed of no more than six individual parts including two light pipes.

4. The compact portable colour sensor claimed in claim 1 wherein the entire compact portable colour sensor for final assembly is constructed of no more than five individual parts including one light pipe.

5. The compact portable colour sensor claimed in claim 1 wherein the cover is manufactured of plastic material.

6. The compact portable colour sensor claimed in claim 1 wherein the light pipe includes an LED cavity for receiving an LED therein.

7. The compact portable colour sensor claimed in claim 6 wherein the light pipe is y shaped wherein the LED cavity forming the top opening of the y.

8. The compact portable colour sensor claimed in claim 6 wherein in the mated position the LED is received within the LED cavity of the light pipe.

9. The compact portable colour sensor claimed in claim 8 wherein the light pipe is y shaped wherein the LED cavity forms the top opening of the y.

10. The compact portable colour sensor claimed in claim 1 wherein the lower housing includes at least one light pipe cavity and at least one cover cavity for slide-ably receiving the light pipe and the cover therein respectively.

11. The compact portable colour sensor claimed in claim 10 wherein the light pipe includes a flange and the light pipe cavity includes at least one light pipe rib which includes a light pipe slot for receiving the light pipe flange slideably therein.

12. The compact portable colour sensor claimed in claim 1 wherein the cover is U shaped and the bottom of the U transmits light to the colour sensor.

13. The compact portable colour sensor claimed in claim 1 wherein the detector portion includes a battery mounted on a top side of the printed circuit board.

* * * * *